United States Patent [19]
Hollands

[11] 3,953,855
[45] Apr. 27, 1976

[54] NAVIGATIONAL GUIDANCE METHOD FOR A PLURALITY OF VESSELS

[75] Inventor: Brian E. Hollands, Vienna, Va.

[73] Assignee: International Engineers Incorporated, Vienna, Va.

[22] Filed: Aug. 5, 1974

[21] Appl. No.: 494,983

[52] U.S. Cl. .................... 343/106 R; 343/112 CA
[51] Int. Cl.² .......................................... G01S 1/44
[58] Field of Search ......... 343/106 R, 112 CA, 107, 343/112 R; 340/3 PS

[56] References Cited
UNITED STATES PATENTS

| | | | |
|---|---|---|---|
| 2,378,242 | 6/1945 | O'Neil | 343/107 |
| 2,419,525 | 4/1947 | Alford | 343/106 R |
| 3,140,391 | 7/1964 | Daspit | 343/112 R |
| 3,234,552 | 2/1966 | Bostwick | 343/106 R |
| 3,267,473 | 8/1966 | Galloway | 343/106 R |
| 3,277,481 | 10/1966 | Robin et al. | 343/100 SA |
| 3,281,844 | 10/1966 | Sabin | 343/106 R |
| 3,302,203 | 1/1967 | Schauffler | 343/112 R |
| 3,563,335 | 2/1971 | Holmes et al. | 340/3 PS |

Primary Examiner—Malcolm F. Hubler
Assistant Examiner—T. M. Blum
Attorney, Agent, or Firm—Perry J. Saidman

[57] ABSTRACT

In order to guide a plurality of landing craft between, for example, a water-borne location and a shoreline, a first VOR-type transmitter is provided at the water-borne location, and a second VOR transmitter is located on shore. In a debarking operation, vessels beginning at substantially the same water-borne location and heading toward substantially the same shore location at the same time are directed to follow respectively different first radials from the first transmitter and second radials from the second transmitter. In this manner, both reliable guidance for a plurality of vessels and collision avoidance are achieved.

3 Claims, 2 Drawing Figures

NAVIGATIONAL GUIDANCE METHOD FOR A PLURALITY OF VESSELS

BACKGROUND OF THE INVENTION

1. Field of the Invention

This invention is related to radial guidance techniques and, more particularly, to a method for determining individual bearings of a plurality of sea-borne vessels for guidance from a first to a second location.

2. Description of the Prior Art

A classic long-standing military naval requirement is to provide accurate guidance for a number of vessels, such as the well-known LST, from a location off shore to the shore or vice-versa. Various guidance methods are as old as the landing craft themselves. For example, visual sighting has long been used to guide a craft to shore while at the same time attempting to avoid collisions with other vehicles. However, limitations such as severe weather, fog or smoke conditions have necessitated the development of specialized guidance instrumentation. Present day instrument guidance systems for a landing craft include well-known radar collision avoidance systems mounted on each landing craft for sensing the presence and approach of other landing craft. Such systems may also include a radar for finding a designated radar target on the shore. Such systems, while generally reliable, are usually quite costly in view of the concomitant requirements of providing both reliable guidance and collision avoidance.

SUMMARY OF THE INVENTION

It is therefore a primary object of the present invention to provide a method for guiding a plurality of landing craft from a central water-borne location to another location, such as a shoreline, or vice-versa, which method requires minimum hardware for each craft, whereby total system expense is significantly lowered.

Another object of the present invention is to provide a simplified navigation technique which utilizes a pair of directional guidance beacons, such as originate from VOR transmitters, whereby reliability and simplicity in operation may be achieved.

An additional object of the present invention is to provide a guidance method for water-borne crafts which inherently includes a collision avoidance capability between the various landing crafts.

The foregoing and other objects are achieved in accordance with one aspect of the present invention through the provision of a method for guiding a plurality of landing craft from a first to a second location, such as from a ship to a shoreline or vice-versa. A first directional guidance beacon is located off-shore and is stabilized with respect to, for example, the North, while a second directional guidance beacon is placed in a second location, such as on the shore. Each beacon transmits a plurality of angularly spaced radials toward the other. Each landing craft operator is directed to follow a distinct radial with respect to the first beacon and then to follow another radial to or toward the second beacon. In this manner, reliable guidance is provided, and collision avoidance is inherently provided. Additionally, the use of this method only requires receivers aboard each landing craft, whereby prior art hardware requirements are substantially reduced without any sacrifice in reliability.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENT

Figure 1:
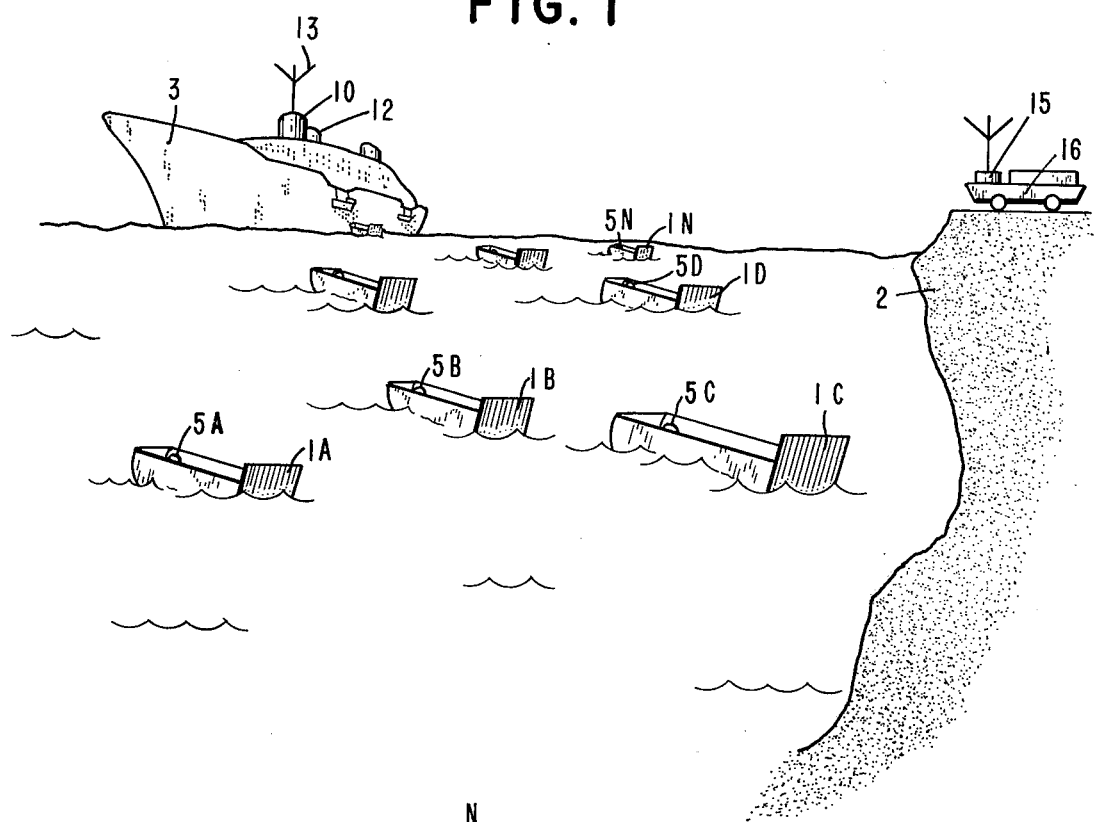
FIG. 1 is a diagrammatic representation of the water-borne crafts and associated hardware utilized in accordance with the present invention.

FIG. 1 is an illustration of a system utilized in accordance with the present invention wherein, for example, it is desired to land a plurality of landing craft 1A, 1B, . . . , 1N at a beachhead 2 reliably and without collision with one another. Reference numeral 1 denotes the landing crafts, all of which, for the purposes of illustration, may be identical. In a common operation, the landing craft 1 debark from a seaborne location in the vicinity of a mother ship 3. It is understood that the method of the present invention while described in connection with a debarkation operation is equally applicable to an embarkation operation, or to a combination of the foregoing. Each landing craft 1 is provided with directional receiver means 5. In FIG. 1, each receiver means 5 is denoted by the letter suffix corresponding to that of the landing craft on which it is located. Receiver means 5 each comprise a pair of well-known VOR (VHF Omnidirectional-Range) receivers which are capable of distinguishing, detecting and identifying a particular VOR beacon from which bearing signals are transmitted and of detecting the bearing of such a signal from the beacon with respect to the beacon axis.

One of the VOR receivers aboard each craft is associated with a first reference transmitter 10 aboard ship 3, while the other VOR receiver aboard each craft is associated with a second reference transmitter 15 on the shore 2, transmitters 10 and 15 to be described in more detail hereinafter. Each of the VOR receivers preferably includes associated indicator means which may comprise, for example, a meter for respectively providing a "LEFT" or "RIGHT" course line indication and a "TO" or "FROM" indicator. The "LEFT/RIGHT" indicator is utilized by the operator of each craft to determine when the craft drifts off course, while the "TO/FROM" indicator provides an indication of the landing craft heading relative to the associated VOR transmitter. Such receiver/indicators are well known in the art and may comprise, for example, model No. NAV/14 manufactured by Narco Avionics of Fort Washington, Pennsylvania. Alternatively, and further by way of example only, the receiver portion of a standard navigation transceiver may be utilized such as the model No. KX/175B or 170B manufactured by King Radio Corporation of Olathe, Kansas, in combination with that same manufacturer's indicator model No. KN1 520. It should be understood by a person of ordinary skill in the art that various well-known equipments may be utilized in conjunction with the present invention, including for example Distance Measuring Equipment, and that the foregoing examples are intended to be merely exemplary and not limiting in any way.

In order to guide the landing craft 1 to the beachhead 2, a first reference transmitter 10 is located on the mother ship 3. Reference transmitter 10 preferably comprises a VOR transmitter which, as is well known in the art, radiates omnidirectional beams or course lines, hereinafter referred to as radials. VOR transmitter 10 is of the same general type as that often utilized in air traffic guidance systems to provide an aircraft with a continuous "along airway" course line. In accordance with the present invention, it has been found that this form of "line-of-sight" transmitter provides reliable transmission over water. Extremely low power, of the order of one watt or less, may be emitted by transmitter 10 in order to confine the radiation to the beachhead area. A stabilizing means 12 is coupled to antenna 13, in order to stabilize radiations of the transmitter 10 with respect to roll and pitch of the mother ship 3. Stabilizing means 12 may comprise a conventional simple gimbal mechanism or, alternatively, may comprise a servo driven gimbal of the type conventionally utilized with stabilized gunmounts. In addition, North stabilization means are also provided so that radiations from the transmitter 10 remain fixed with respect to a reference plane and reliable guidance may be provided for the landing craft 1. North stabilization may be achieved by slaving the orientation of antenna 13 to the ship's gyro. Any differences in the ship's heading will be adjusted by the gyro which may drive a conventional servomechanism to maintain the Northern orientation of antenna 13.

Further in accordance with the present invention, a second positionable reference VOR transmitter 15 is located on the beachhead 2. The second reference transmitter 15 may be mounted on an amphibious vehicle 16 which is placed on the shore subsequent to the establishment of the beachhead. A conventional VOR transmitter suitable for use as transmitters 10 and 15 include, by way of example, model No. 780 manufactured by Edo Commercial Corporation of Melville, New York. Such conventional transmitters may require minor modifications to reduce output power as mentioned hereinabove, to provide ship stabilization, and may include transmitter blanking to limit radiation to the generally small area of interest. Again, it will be appreciated that the particular VOR transmitter required for the present invention is well within the ordinary state of the art, and the foregoing example is not intended to be limiting in any manner.

The operation of the system will be described with reference to FIG. 2, wherein like reference numerals represent identical or corresponding elements as those denoted in FIG. 1.

Figure 2:
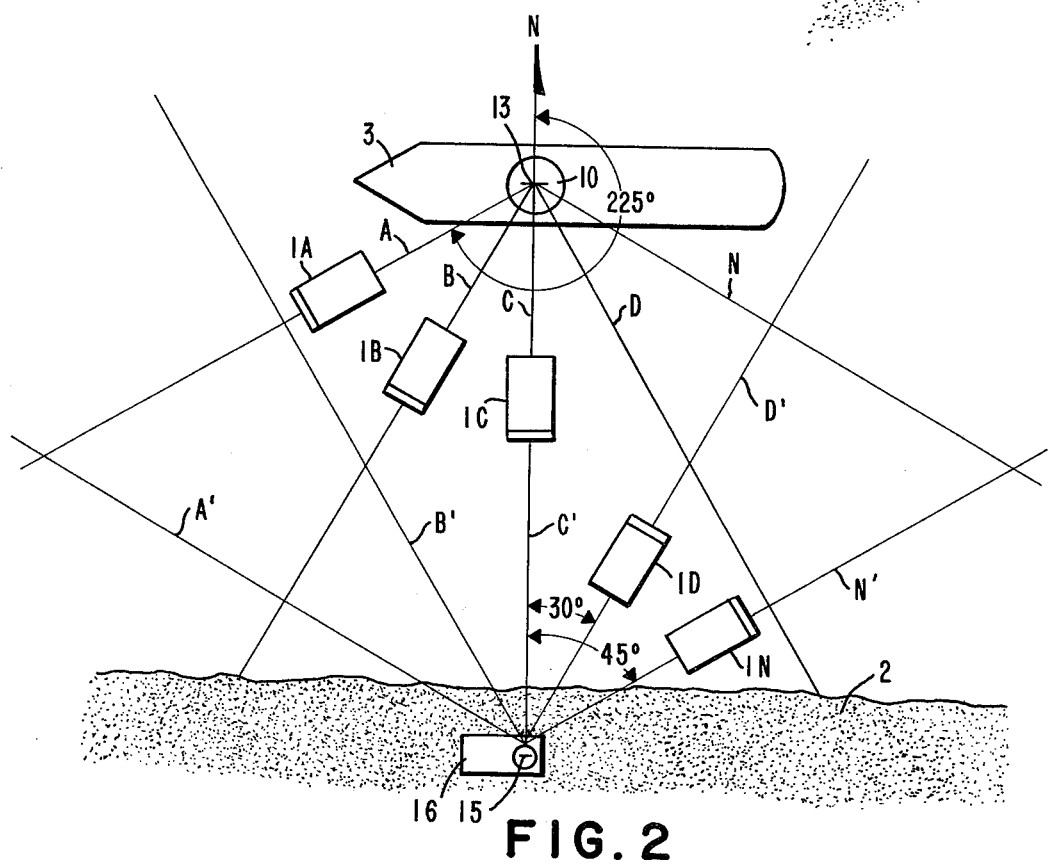
FIG. 2 is a top schematic view of FIG. 1 helpful in understanding the operation of the system according to the method of the present invention.

FIG. 2 is seen to illustrate a simultaneous debarkation and embarkation operation wherein landing crafts 1A, 1B and 1C are heading from ship 3 to shore 2, while landing crafts 1D and 1N are heading from shore 2 to ship 3. The mother ship 3 transmits radial signals A, B, C, D, . . . , N from the transmitter 10. As is well known with respect to VOR transmitters, only one signal is actually transmitted, and phase detection circuitry in each VOR "ship" receiver aboard landing craft 1 computes the phase angle between a straight line from the receiver 5 to the transmitter 10 and a reference axis. In the embodiment depicted in FIG. 2, the straight line C–C' from the transmitter 10 to the transmitter 15, parallel with the North-South directions, may be utilized as the reference axis. Therefore, radials emanating from the transmitters 10 and 15, respectively, may be identified by their clockwise angular displacement from the North direction. For example, the radial A emanating from the transmitter 10 may be referred to as the 225° radial, while the radial N' transmitted from the transmitter 15 may thus be designated as the 45° radial. The two transmitters 10 and 15 transmit at different frequencies so that each pair of receivers within each craft may simultaneously detect the craft's bearing with respect to each transmitter 10 and 15.

In accordance with the present invention, different lanes are selected for each craft to follow, each lane consisting of a first radial transmitted from the transmitter 10 and a second radial transmitted from the transmitter 15. The lanes are seen to diverge upon leaving the mother ship 3 and converge at the transmitter 15 positioned on the vehicle 16. By locating the transmitter 15 somewhat inland of the beachhead 2, all the lanes will intersect the beachhead 2 at spaced locations. Accordingly, a unique path or lane for each craft between the mother ship 3 and the shore 2 may be defined by following a first radial from transmitter 10 to its intersection with a corresponding radial from transmitter 15, and then following the latter radial to the beachhead 2. The reverse procedure is utilized for those crafts heading from beachhead 2 to ship 3. In accordance with the operation depicted in FIG. 2, lanes A–A', B–B' and C–C' define inbound lanes, while lanes D–D' and N–N' each define outbound lanes.

In the performance of the method of the present invention, a dispatcher who, for example, may be positioned aboard the mother ship 3, allocates to each operator of each landing craft 1 a lane. For example, the operator of debarking landing craft 1A might be told to follow lane A–A' consisting of the 225° radial A from the transmitter 10 and the 315° radial A' from the transmitter 15. The operator of embarking landing craft 1D may be assigned to follow lane D'–D consisting of the 30° radial D' from the transmitter 15 and the 150° radial D from the transmitter 10.

The operator of each craft 1 observes his "ship" and "shore" receivers in order to maintain position in his assigned lane. Each transmitter and receiver may be calibrated so that rather than having to interpret a numerically designated course, the operator may simply set his dial to, for example, lane A–A'. He would then follow his "LEFT/RIGHT" indicator of one receiver showing his bearing with respect to the transmitter away from which he is traveling, and then the "LEFT/RIGHT" indicator associated with the other receiver showing his bearing with respect to the transmitter towards which he is heading. The "TO/FROM" indicators may be utilized as needed to determine which of the two "LEFT/RIGHT" indicators should be read at any given point in the course of travel. Thus, the operator will initially observe both "LEFT/RIGHT" indicators to determine firstly that he is maintaining course on the first radial, and secondly to determine when he is at the intersection of his first assigned radial and second assigned radial which occurs, for example, when both "LEFT/RIGHT" indicators read mid-range. When the operator reaches the intersection of the two radials, he need steer only by the signal from the transmitter towards which he is heading.

In a typical application in which the transmitters 10 and 15 are a distance of 10 miles from each other, it is generally satisfactory to separate adjacent lanes by approximately 10°, and as many lanes as are required may be allocated. All lanes may be used for a debarkation operation, or for an embarkation operation, or for a combination thereof, as illustrated in FIG. 2.

It is thus seen that the present invention makes novel use of well-known VOR transmitters and receivers, and provides accurate guidance simultaneously for a plurality of landing craft while inherently providing collision avoidance at a far lower cost than prior art systems.

Obviously, numerous modifications and variations of the present invention are possible in light of the above teachings. It is therefore to be understood that within the scope of the appended claims the invention may be practiced otherwise than as specifically described herein.

What is claimed as new and is desired to be secured by Letters Patent of the United States is:

1. A collision avoidance method for simultaneously guiding a plurality of water craft through water along different preassigned lanes between a water-borne location and a second location such as a beachhead comprising the steps of:

positioning a first VHF omnidirectional-range transmitter at the water-borne location;

positioning a second VHF omnidirectional-range transmitter at the second location, said first and second transmitters operating at first and second different frequencies, respectively, the signals generated by each of said transmitters defining a plurality of radials diverging therefrom and directed toward the other transmitter;

providing first and second directional VHF omnidirectional-range receivers on each of said plurality of water craft tuned respectively to said first and second frequencies of said first and second transmitters; and simultaneously guiding each of said plurality of water craft through the water along a unique one of said preassigned lanes, a different one of said lanes being preassigned for each water craft, each of said preassigned lanes consisting of the continuous path defined by a unique pair of intersecting radials from amongst said plurality of radials, one radial of each of said pair of radials emanating from said first transmitter, the other radial of each of said pair of radials emanating from said second transmitter, whereby collision between two water craft is prevented.

2. The method according to claim 1 wherein said step of positioning said first transmitter includes the step of stabilizing said transmitter with respect to pitch and roll.

3. The method according to claim 2 wherein said first transmitter is positioned on a mother ship at said water-borne location.

* * * * *